(12) United States Patent
Aziz et al.

(10) Patent No.: US 8,457,222 B2
(45) Date of Patent: Jun. 4, 2013

(54) METHOD FOR ESTIMATING CHANNEL STATISTICS IN AN OFDM RECEIVER

(75) Inventors: Ahsan U. Aziz, Austin, TX (US); Sili Lu, Austin, TX (US)

(73) Assignee: Apple Inc., Cupertino, CA (US)

( * ) Notice: Subject to any disclaimer, the term of this patent is extended or adjusted under 35 U.S.C. 154(b) by 1084 days.

(21) Appl. No.: 12/204,975

(22) Filed: Sep. 5, 2008

(65) Prior Publication Data
US 2010/0061468 A1 Mar. 11, 2010

(51) Int. Cl.
*H04L 27/01* (2006.01)
(52) U.S. Cl.
USPC ......................................................... 375/260
(58) Field of Classification Search
USPC .......................................... 375/260, 224, 343
See application file for complete search history.

(56) References Cited

U.S. PATENT DOCUMENTS

| | | | |
|---|---|---|---|
| 2006/0227887 A1 | 10/2006 | Li et al. | |
| 2007/0053448 A1* | 3/2007 | Schwoerer et al. | 375/260 |
| 2009/0290665 A1* | 11/2009 | Yoshida et al. | 375/347 |
| 2009/0323790 A1* | 12/2009 | Yousef | 375/224 |

OTHER PUBLICATIONS

Abdi et al; "A parametric model for the distribution of the angle of arrival and the associated correlation function and power spectrum at the mobile station"; IEEE Transactions on Vehicular Technology vol. 51, Issue 3, May 2002 pp. 425-434.
Tepedelenlioglu et al; "On velocity estimation and correlation properties of narrow-band mobile communication channels"; IEEE Transactions on Vehicular Technology vol. 50, Issue 4, Jul. 2001 pp. 1039-1052.

* cited by examiner

*Primary Examiner* — Sam K Ahn
*Assistant Examiner* — Shawkat M Ali
(74) *Attorney, Agent, or Firm* — Gazdzinski & Associates, PC

(57) ABSTRACT

A method of estimating channel statistics includes storing a plurality of pilot symbols from a plurality of received signals, establishing a reference for correlation; computing instantaneous correlations for each time lag of each of the plurality of pilot symbols relative to the reference, providing a table comprising non-isotropic scattering correlation values, computing current refined correlations using previous refined correlations and instantaneous correlations, comparing current refined correlations to the table of correlation values, and choosing correlation values from the table based on the step of comparing current refined correlations to the table.

21 Claims, 3 Drawing Sheets

TABLE OF CORRELATION VALUES

24

| MODEL $\Theta_1$ |
| --- |
| SPEED 0 |
| SPEED 1 |
| SPEED 2 |
| ⋮ |
| SPEED N |
| MODEL $\Theta_2$ |
| SPEED 0 |
| ⋮ |
| SPEED N |
| MODEL $\Theta_3$ |
| SPEED 0 |
| ⋮ |
| SPEED N |

*FIG. 3*

METHOD FOR ESTIMATING CHANNEL STATISTICS IN AN OFDM RECEIVER

BACKGROUND

1. Field

This disclosure relates generally to receivers, and more specifically, to estimating channel statistics in an OFDM (orthogonal frequency division multiplexing) receiver.

2. Related Art

In an OFDM transmission system a receiver will perform a channel estimation to determine the channel. The channel estimates are used by the receiver to determine how to provide compensation in order to accurately reproduce a signal as transmitted by a transmitter. Channel statistics are used to compute channel estimation filter coefficients. For example, the channel estimates may be used to choose filter coefficients for an FIR (finite impulse response) filter. There are many different methods for determining the channel statistics. Many of the methods involve using complex algorithms with varying degrees of accuracy.

Therefore, what is needed is a method for estimating channel statistics that is relatively simple and provides high accuracy.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 3 illustrates the table of FIG. 1 in more detail.

DETAILED DESCRIPTION

Figure 1:
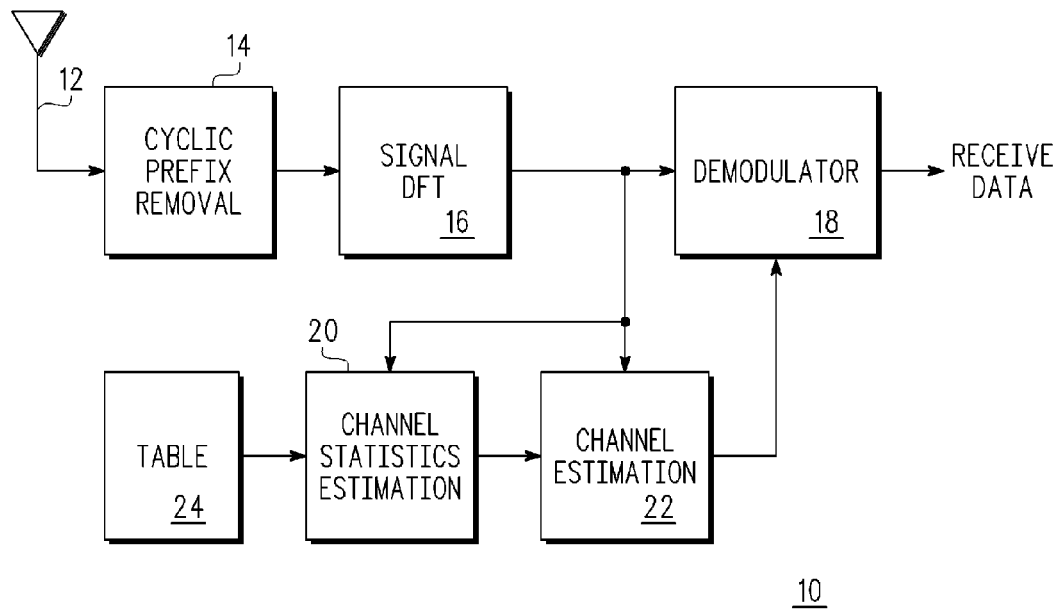
FIG. 1 illustrates, in block diagram form, an OFDM receiver in accordance with an embodiment.

Generally, there is provided, a method for estimating channel statistics for an OFDM receiver that uses isotropic and non-isotropic scattering models to determine correlation values to be used in the generation of FIR filter taps. More specifically, in one embodiment, current refined correlations are computed from previous refined correlations and instantaneous correlations. The current refined correlations are compared to correlation values stored in a look-up table. The method is performed iteratively so that after a predetermined convergence is reached with a table valve, the table value is used for channel estimation. In one embodiment, the table may include correlation values for transmission angle, speed, and angular distribution. The disclosed method provides the advantage of more accurately determining channel estimation without adding complexity.

In one aspect, there is provided, a method for estimating channel statistics, the method comprising: storing a first pilot symbol from a first received signal; storing a second pilot symbol from a second received signal; computing a first instantaneous normalized correlation using the first pilot symbol and the second pilot symbol, wherein the first instantaneous normalized correlation corresponds to a lag time between the first pilot symbol and the second pilot symbol; computing a first refined correlation using the first instantaneous correlation; comparing the first refined correlation to a table of correlation values, wherein the table comprises correlation values that depend on an angle of arrival of a signal; and choosing first temporal correlation values from the correlation values of the table based on the step of comparing the first refined correlation to the table of correlation values. The method may further comprise: storing a third pilot symbol from a third received signal; computing a second instantaneous normalized correlation using the first pilot symbol and the third pilot symbol, wherein the second instantaneous correlation corresponds to a time lag between the first pilot symbol and the third pilot symbol; computing a second refined correlation using previously refined correlation having the same lag and the second instantaneous correlation; comparing the first and the second refined correlations to the temporal correlation values from the table of correlation values; and choosing second temporal correlation values from the table of correlation values based on the first temporal correlation value and the second correlation estimation value. The method may further comprise: computing a third instantaneous correlation value using the second pilot symbol and the third pilot symbol, wherein: the third instantaneous correlation value corresponds to a time lag between the second pilot symbol and the third pilot symbol; and computing a third refined correlation using the third instantaneous correlation and previously computed refined correlation for the same lag. The first received signal may be an orthogonal frequency division multiplexed (OFDM) signal. The pre computed correlation values of the table may depend on the speed at which the receiver of the signal is traveling. The first pilot symbol and the third pilot symbol may be in different subframes of the signal. The first pilot signal and the second pilot signal may be in the frequency domain and the first received signal and the second received signal may be multiple carrier signals.

In another aspect, there is provided, a method of estimating channel statistics, the method comprising: providing a table, wherein the table comprises a plurality of entries, wherein each entry corresponds to correlation values for predetermined angles of arrival of the signal, a distribution of the angles of arrival, and predetermined speeds at which a receiver of the signal is traveling; storing a plurality of pilot symbols from a plurality of received signals; establishing a reference for correlation; computing instantaneous correlations, wherein computing instantaneous correlations comprises computing instantaneous correlations for each time lag of each of the plurality of pilot symbols relative to the reference; computing current refined correlations using previous refined correlations and the instantaneous correlations; comparing current refined correlations to the table of correlation values; and choosing correlation values from the table based on the step of comparing current refined correlations and the previously refined correlation at different lags to the table. Establishing the reference may further comprise choosing a pilot symbol as the reference. Computing instantaneous correlations may further comprise computing instantaneous correlations for each time lag between pairs of the plurality of pilot symbols. Choosing correlation values from the table may further comprise determining the correlations values that are most similar to the current refined correlations. The method may further comprise: repeating storing the plurality of pilot symbols, establishing a reference for normalizing the correlation, computing instantaneous correlations, and computing current refined correlations, wherein at least one of the plurality of pilot symbols has changed; comparing the current refined correlations to a subset of the table of correlation values after repeating computing current refined correlations; and choosing values from the subset of the table. The plurality of received signals may further comprise multiple carrier signals. The table may further comprise each entry corresponding to correlation values for predetermined angular distributions of the signal; and providing the table may further comprise: calculating each entry for the predetermined angles of arrival, predetermined speeds, and predetermined angular distributions; and storing each entry.

In yet another embodiment, there is provided, a method of estimating channel statistics, the method comprising: providing a table comprising non-isotropic scattering correlation values; computing current refined correlations using previous refined correlations and instantaneous correlations; comparing current refined correlations to the table of correlation values; and choosing correlation values from the table based on the step of comparing current refined correlations to the table. The method may further comprise: extracting a plurality of pilot symbols from a plurality of received signals; establishing a reference for correlation; and computing instantaneous correlations, wherein: computing the instantaneous correlations comprises computing instantaneous correlations for each time lag of each of the plurality of pilot symbols relative to the reference; and computing the instantaneous correlations is performed before the step of computing the current refined correlations. The table may further comprise isotropic scattering correlation values. The step of establishing the reference may further comprise choosing a pilot symbol as the reference. The step of computing instantaneous correlations may further comprise computing instantaneous normalized correlations for each time lag between pairs of the plurality of pilot symbols. Also, choosing correlation values from the table may further comprise determining the correlation values that are most similar to the current refined correlations.

FIG. 1 illustrates, in block diagram form, an OFDM receiver 10 in accordance with an embodiment. Receiver 10 includes antenna 12, cyclic prefix removal block 14, signal DFT (discrete Fourier transform) block 16, demodulator block 18, channel statistics estimation block 20, channel estimation block 22, and table 24. Generally, an OFDM symbol is transmitted with a cyclic prefix. A frame may include several OFDM symbols, some of which may be pilot symbols or may contain pilot subcarriers within some OFDM symbols. Cyclic prefix removal block 14 has an input coupled to antenna 12, and an output, and is used to remove the cyclic prefix from the received OFDM symbols. Signal DFT 16 has an input coupled to the output of cyclic prefix removal block 14, and an output. The signal DFT 16 converts the time domain signal to the frequency domain. Demodulator 18 has a first input coupled to the output of signal DFT 16, a second input, and an output for providing a data signal labeled "RECEIVE DATA". Channel estimation block 22 has a first input coupled to the output of signal DFT block 16, a second input, and an output coupled to the second input of demodulator 18. Channel statistics estimation block 20 has a first input coupled to the output of signal DFT block 16, a second input, and an output coupled to the second input of channel estimation block 22.

As indicated above, receiver 10 receives modulated signals comprising symbols transmitted by an OFDM transmitter (not shown) at antenna 12. Possible modulation schemes used with OFDM include binary phase shift keying (BPSK), in which one bit is encoded to each subcarrier of the OFDM symbol, quadrature phase shift keying (QPSK), in which two bits are encoded to each subcarrier of the OFDM symbol, or even a quadrature amplitude modulation (QAM) scheme in which multiple bits are encoded to each subcarrier of the OFDM symbol. Ideally, the received OFDM signal will be the same in amplitude as the signal transmitted by the transmitter. However, in any kind of fading channel, such as a wireless transmission channel, the amplitude of a received signal will vary based on the particular properties of the channel. For example, signal interference can reduce the power of the received signal, while multi-path reflections can increase the power of the received signal.

To reproduce the received signal as accurately as possible, the receiver will perform a channel estimation process to determine the effect the channel has on a received signal. Based on this channel estimation, the receiver will then determine how to compensate the received signal to retrieve the originally-transmitted signal.

Channel estimation block 22 uses a minimum mean squared error (MMSE) channel estimation algorithm to compensate the received signal. Preferably, a MMSE interpolator is implemented as a Wiener filter, which requires channel statistics and matrix inversion. Using a frequency-domain MMSE estimator, channel estimations for all the subcarriers in pilot symbol are obtained by interpolating across frequency-domain. Then by interpolating across time-domain using a time-domain estimator, channel estimations for all data symbols are obtained. Note that in other embodiments, a different channel estimation algorithm may be used, such as a fast Fourier transform (FFT). Channel statistics are provided to channel estimation block 22 by channel statistics estimation block 20. In accordance with the embodiment, channel statistics estimation block 20 receives pilot symbols from the received data symbols, computes normalized correlations between the OFDM symbols that contain the pilot subcarriers or the pilot symbols and uses the computed correlations to choose correlation values from a table of correlation values. Isotropic and non-isotropic scattering models for providing channel statistics are used. The isotropic scattering models assume uniformly distributed angles of arrival at the receiver from every direction, i.e $[-\pi, \pi]$. The non-isotropic scattering models assume a non-uniform distribution of angles of arrival. In one embodiment, the time-domain channel estimation based on a non-isotropic model is given by $$p(\theta) = \exp[k \cos(\theta - m\theta)]/2\pi I_0(k),$$

where m is a mean of the angle of arrival of a transmitted signal, $I_0$ is a zero-order modified Bessel function, and k is a scattering factor that controls a width of the angle of arrival. The time-domain correlation based on this non-isotropic model is $$\phi(\tau) = \frac{I_0(\sqrt{k^2 - 4\pi^2 f_m^2 \tau^2 + j4\pi k \cos(m_0) f_m \tau})}{I_0(k)}$$

where $f_m$ is the Doppler frequency.

The time correlation estimation procedures include pre-computing a look-up table of time correlation corresponding to isotropic and non-isotropic scattering models for different speeds. Pilot symbols are stored. Instantaneous correlation using the stored and most recent pilot symbol is computed. An estimated correlation is computed and updated using the instantaneous correlation by $$\hat{R}^{(n)}(\tau) = (1-\alpha)\hat{R}^{(n-1)}(\tau) + \alpha \bar{R}(\tau)$$

where
$\hat{R}^{(n)}(\tau)$: Estimated correlation at lag $\tau$ for iteration n
$\bar{R}(\tau)$: Instantaneous correlation at lag $\tau$
$\alpha$: Forgetting factor used to combine the correlation with the new one Use correlation values at, for example, four different time lags to choose the model and speed from the pre-computed table by $$\operatorname*{argmin}_{A,B} \sum_{\tau=3,4,7,10} |R^{A,B}(\tau) - \hat{R}(\tau)|^2$$

Once the correlation estimation result converges to a certain scattering model, the search space can be limited to that model to reduce complexity and false rate. In the illustrated embodiment, a maximum of 3 OFDM pilot symbols will be stored in memory. The method iteratively combines a previously estimated correlation with the instantaneous correlation estimate to insure the convergence of the correlation estimate.

Preferably, receiver 10 is compliant with the LTE (long term evolution) or IEEE (Institute of Electrical and Electronics Engineers) 802.6e or another wireless transmission standard. Using the described method for iteratively computing the temporal correlation of a fading channel and then approximating the correlation profile based on isotropic and non-isotropic scattering models, provide channel statistics estimates with low complexity that enables more accurate channel estimation.

Figure 2:
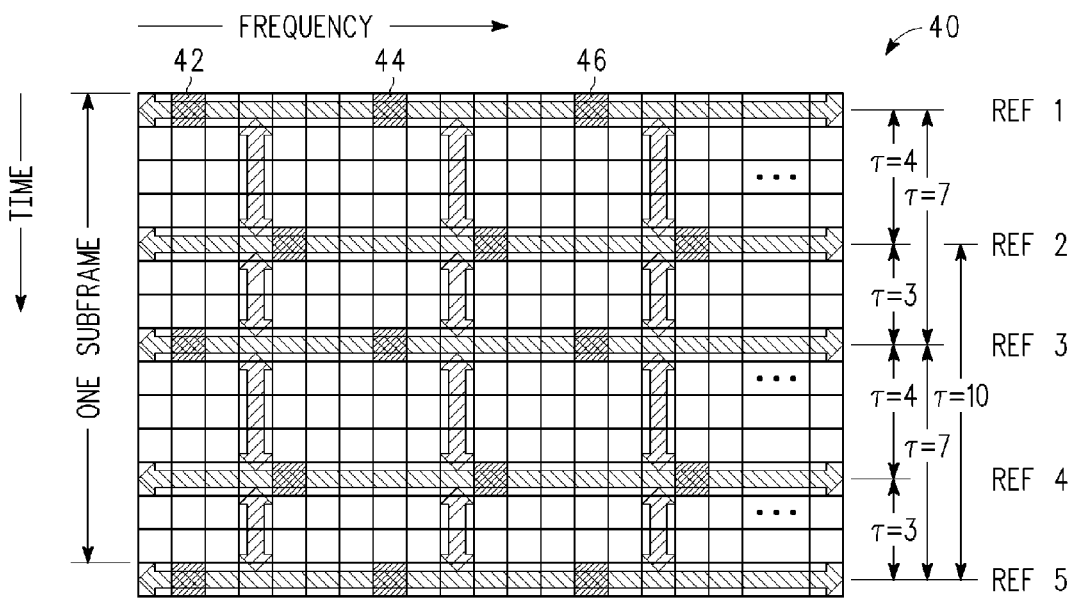
FIG. 2 illustrates a graph of time versus frequency of a subframe of data.

FIG. 2 illustrates a time versus frequency grid of an example subframe 40 of data in accordance with the LTE wireless standard. A subframe is 1 millisecond long and includes 14 OFDM symbols. The pilot symbols in the subframe includes a number of pilot subcarriers, for example, pilot subcarriers 42, 44, and 46 in a pilot symbol labeled "REF 1". In FIG. 2, there are three OFDM symbols of data and then another pilot symbol labeled "REF 2". In accordance with an embodiment, a curve fitting pre-computed table entries, such as from table 24, is performed based on correlations at four different time lags. A time lag between REF 1 and REF 2 is labeled τ=4. Likewise, a time lag of τ=3 is between REF 2 and REF 3, a time lag of τ=4 is between REF 3 and REF 4, and a time lag of τ=3 is between REF 4 and REF 5. Also, a time lag of τ=7 is shown between REF 1 and REF 3 and between REF 3 and REF 5, and a time lag of τ=10 is shown between REF 2 and REF 5. Therefore, in the example illustrated in FIG. 2, the curve may be computed using lags τ=3, τ=4, τ=7, and τ=10. A table entry is chosen that best matches the scattering environment and speed of the receiver. Between the pilot subcarriers in a symbol are data subcarriers. There can be any different number of data subcarriers (within Nyquist sampling constraints), for example, in the illustrated embodiment there are 5 data subcarriers between two pilot subcarriers.

FIG. 3 illustrates an example look-up table 24 of FIG. 1 in more detail. The table includes correlation values for a spread (width) of angles of arrival, speed, and angular distribution. The table entries can include isotropic and non-isotropic scattering correlation values. Table 24 entries are divided into subsets, or blocks, based on spread (width) of the angle of arrival at the receiver due to the scatters. For example, one memory block includes an angle of arrival labeled "MODEL θ1". Entries in each memory block are based on speed of the receiver and on angular distribution. For example, each block in FIG. 3 includes receiver speeds SPEED 0 through SPEED N. Angular distribution can be uniform or not uniform. An example of a not-uniform distribution would be a Gaussian distribution. In a preferred embodiment, the angular distribution is assumed to be uniform. In one embodiment the look-up table 24 is implemented as SRAM (static random access memory), DRAM (dynamic random access memory), flash memory, or any other type of volatile or non-volatile memory in a data processing system having a digital signal processor (DSP) core. In another embodiment, the table 24 may be implemented as a stand-alone integrated circuit memory and the processor may be a general purpose processor.

Figure 4:
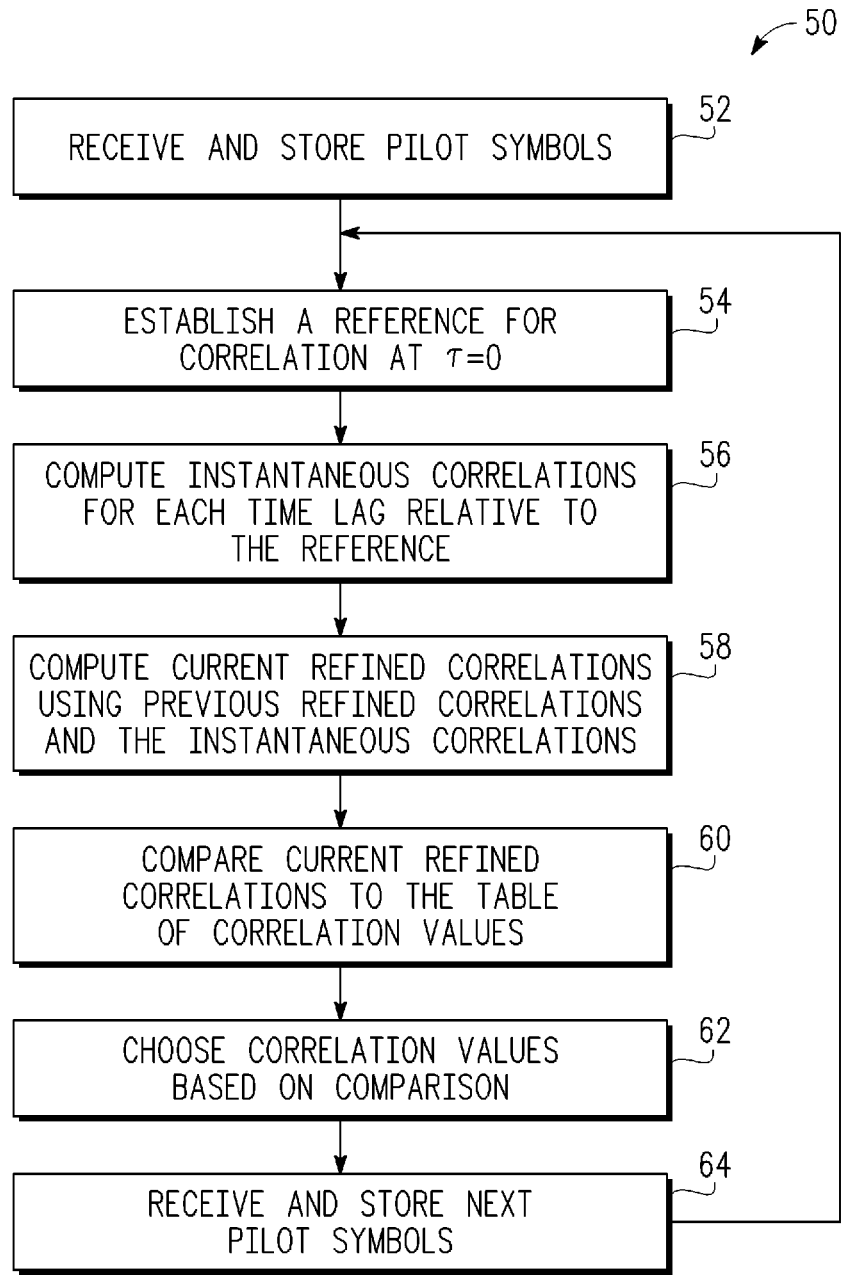
FIG. 4 illustrates a flow chart of a method for estimating channel statistics in accordance with an embodiment.

FIG. 4 illustrates a flow chart of a method 50 for estimating channel statistics in accordance with an embodiment. In accordance with the method 50, at step 52, pilot symbols are received, converted to the frequency-domain and stored. In one embodiment, the received pilot symbols may be from different subframes of the received signal. For example, in FIG. 2, a first pilot symbol REF 1 may be received and stored and a second pilot symbol REF 2 may be received and stored to form a different subframe. This would allow autocorrelation estimation for longer lags. In another embodiment, the pilot symbols may be from the same subframe. At step 54, a reference for correlation is established at time lag τ=0. In FIG. 2, time lag τ=0 corresponds to the pilot symbol REF 1. A time lag between pilot symbols REF 1 and REF 2 of FIG. 2 is shown as τ=4. At step 56, instantaneous correlations for each time lag relative to the reference at τ=0 is computed and normalized by the established reference. As illustrated in FIG. 2, instantaneous correlations are computed for time lags τ=3, 4, 7, and 10. In other embodiments, the instantaneous correlations may be computed for different time lags. At step 58, refined correlations for the current subframe are computed using the instantaneous correlations computed in step 56 and using the previously computed refined correlations for same lag values. At step 60, the current refined correlations are compared to the pre-computed correlation values stored in look-up table 24 (FIG. 3) which is based on angle of arrival and speed of the receiver. At step 62, correlation values are chosen from table 24 based on the comparison. In the illustrated embodiment, the correlation values closest to the current refined correlations are used. At step 64, pilot symbols for the next subframe are received and stored. The method returns to step 54 and is repeated for the next pilot symbols and all subsequently received pilot symbols. Once the correlation estimation result converges to a certain scattering model from the pre-computed table, the search space can be limited to that model to reduce complexity and false rate.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Some of the above embodiments, as applicable, may be implemented using a variety of different information processing systems. For example, although FIG. 1 and the discussion thereof describe an exemplary receiver 10, this exemplary receiver is presented merely to provide a useful reference in discussing various aspects of the invention. Of course, the description of the receiver has been simplified for purposes of discussion, and it is just one of many different types of appropriate receivers that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Also for example, in one embodiment, the illustrated elements of receiver 10 are circuitry located on a single integrated circuit or within a same device. Alternatively, receiver 10 may include any number of separate integrated circuits or separate devices interconnected with each other. Also for example, receiver 10 or portions thereof may be software or code representations of physical circuitry or of logical representations convertible into physical circuitry. As such, receiver 10 may be embodied in a hardware description language of any appropriate type.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method of estimating channel statistics, the method comprising: providing a table stored within a non-transitory computer-readable medium, wherein the table comprises a plurality of entries, wherein each entry corresponds to correlation values for predetermined spread of angles of arrival of a signal and predetermined speeds at which a receiver of the signal is traveling; storing a plurality of pilot symbols from a plurality of received signals to the non-transitory computer-readable medium; establishing a reference for correlation; computing instantaneous normalized correlations via a processor, wherein said computing instantaneous normalized correlations comprises computing instantaneous normalized correlations for each time lag of each of the plurality of pilot symbols relative to the reference; computing current refined correlations via the processor using previous refined correlations at the corresponding lag values and the instantaneous normalized correlations; comparing current refined correlations to the table of correlation values stored within the non-transitory computer-readable medium; and choosing correlation values from the table based on the step of comparing current refined correlations to the table.

2. The method of claim 1, wherein establishing the reference comprises choosing a pilot symbol as the reference for correlation computation.

3. The method of claim 2, wherein said computing instantaneous normalized correlations further comprises computing instantaneous normalized correlations for each time lag between pairs of the plurality of pilot symbols normalized for the established reference.

4. The method of claim 1, wherein said choosing correlation values from the table comprises determining the correlations values that are most similar to the current refined correlations.

5. The method of claim 1, further comprising: repeating said storing the plurality of pilot symbols, said establishing a reference for correlation, said computing instantaneous normalized correlations, and said computing current refined correlations, wherein at least one of the plurality of pilot symbols has changed; comparing the current refined correlations to a subset of the table of correlation values after repeating computing current refined correlations; and choosing values from the subset of the table.

6. The method of claim 1, wherein the plurality of received signals comprises multiple carrier signals.

7. The method of claim 1, wherein:
the table further comprises each entry corresponding to correlation values for predetermined angular distributions of the signal; and
providing the table further comprises:
calculating each entry for the predetermined angles of arrival spread, predetermined speeds, and predetermined angular distributions; and
storing each entry.

8. A method of estimating channel statistics, the method comprising: providing a table comprising non-isotropic scattering temporal correlation values stored within a non-transitory computer-readable medium; storing a plurality of pilot symbols from a plurality of received signals to the non-transitory computer-readable medium; establishing a reference for correlation; computing instantaneous correlations for each time lag of each of the plurality of pilot symbols relative to the reference; computing current refined correlations via a processor, using previous refined correlations and the instantaneous correlations, where computing the instantaneous correlations is performed before the step of computing the current refined correlations; and comparing the current refined correlations to the table of correlation values stored within the non-transitory computer-readable medium, via the processor; choosing correlation values from the table via the processor, based on the step of comparing current refined correlations to the table; and wherein the non-isotropic scattering temporal correlation values are associated with a plurality of predetermined angles of arrival for a signal.

9. The method of claim 8, wherein the table further comprises isotropic scattering temporal correlation values.

10. The method of claim 8, wherein establishing the reference comprises choosing a pilot symbol as the reference.

11. The method of claim 10, wherein said computing instantaneous correlations further comprises computing instantaneous correlations for each time lag between pairs of the plurality of pilot symbols.

12. The method of claim 8, wherein said choosing correlation values from the table comprises determining the correlation values that are most similar to the current refined correlations.

13. An apparatus configured to estimate channel statistics, the apparatus comprising: a wireless interface; a processor; a data structure comprising non-isotropic scattering correlation values where the non-isotropic scattering correlation values are associated with a plurality of predetermined angles of arrival for a signal; and a non-transitory computer readable apparatus having a storage medium with at least one computer program stored thereon, the at least one computer program configured to, when executed on the processor: store a plurality of pilot symbols from a plurality of received signals; establish a reference for correlation; compute one or more instantaneous correlations, wherein the one or more instantaneous correlations comprise a first correlation for each time lag of each of the plurality of pilot symbols relative to the reference; compute current refined correlations from one or more previous refined correlations and the one or more instantaneous correlations; compare current refined correlations to at least portions of the non-isotropic scattering correlation values of the data structure; and choose non-isotropic scattering correlation values from the data structure based on compared current refined correlations.

14. The apparatus of claim 13, wherein the data structure further comprises isotropic scattering correlation values.

15. The apparatus of claim 13, wherein the established reference comprises a pilot symbol.

16. The apparatus of claim 15, wherein the one or more instantaneous correlations further comprise a second correlation for each time lag between pairs of the plurality of pilot symbols.

17. The apparatus of claim 13, wherein the chosen non-isotropic scattering correlation values are chosen based on similarity to the current refined correlations.

18. The apparatus of claim 13, wherein the plurality of pilot symbols are received at different times.

19. The apparatus of claim 13, wherein the plurality of pilot symbols are received concurrently.

20. A wireless apparatus configured to operate using one or more estimates of channel statistics, the apparatus comprising: a wireless interface; a processor; a storage apparatus in data communication with the processor, the storage apparatus comprising data values relating to spatial asymmetries of one or more antennae, the data values associated with a plurality of predetermined angles of arrival for a signal at the one or more antennae; and a non-transitory computer readable apparatus having at least one computer program stored thereon, the at least one computer program configured to, when executed on the processor: store a plurality of pilot symbols from a plurality of received signals; establish a reference for correlation; compute one or more instantaneous correlations, wherein the one or more instantaneous correlations comprise a first correlation for each time lag of each of the plurality of pilot symbols relative to the reference; compute current refined correlations from one or more previous refined correlations and the one or more instantaneous correlations; compare current refined correlations to at least a portion of the data values; and select one or more data values from the storage apparatus based at least in part on compared current refined correlations.

21. The apparatus of claim 20, wherein the data values relating to spatial asymmetries of one or more antennae comprise non-isotropic scattering correlation values.

* * * * *